United States Patent
Su et al.

(10) Patent No.: US 11,626,928 B2
(45) Date of Patent: Apr. 11, 2023

(54) PERFORMANCE ESTIMATION APPARATUS AND METHOD FOR NONLINEAR COMMUNICATION SYSTEM AND AN ELECTRONIC DEVICE

(71) Applicant: Fujitsu Limited, Kawasaki (JP)

(72) Inventors: Xiaofei Su, Beijing (CN); Tong Ye, Beijing (CN); Zhenning Tao, Beijing (CN); Chengwu Yang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/506,133

(22) Filed: Oct. 20, 2021

(65) Prior Publication Data
US 2022/0166520 A1    May 26, 2022

(30) Foreign Application Priority Data
Nov. 20, 2020    (CN) .......................... 202011306919.5

(51) Int. Cl.
*H04B 10/58* (2013.01)
*H04B 10/294* (2013.01)
*H04B 10/61* (2013.01)

(52) U.S. Cl.
CPC ......... *H04B 10/58* (2013.01); *H04B 10/2941* (2013.01); *H04B 10/6163* (2013.01); *H04B 10/6165* (2013.01)

(58) Field of Classification Search
None
See application file for complete search history.

(56) References Cited

U.S. PATENT DOCUMENTS

| | | | |
|---|---|---|---|
| 2002/0048062 A1* | 4/2002 | Sakamoto | H04B 10/2916 398/30 |
| 2006/0197577 A1* | 9/2006 | Mukherjee | H03F 3/08 327/317 |
| 2009/0214215 A1* | 8/2009 | Li | H04B 10/2507 398/43 |
| 2011/0095819 A1* | 4/2011 | Velazquez | H03F 1/3247 330/149 |

(Continued)

FOREIGN PATENT DOCUMENTS

| | | |
|---|---|---|
| CN | 102884736 A | 1/2013 |
| CN | 109462435 A | 3/2019 |
| CN | 110971295 A | 4/2020 |

OTHER PUBLICATIONS

José C. Pedro, et al., "Designing Multisine Excitations for Nonlinear Model Testing", IEEE Transactions on Microwave Theory and Techniques, vol. 53, No. 1, Jan. 2005.

(Continued)

*Primary Examiner* — Darren E Wolf
(74) *Attorney, Agent, or Firm* — Staas & Halsey LLP (57) ABSTRACT

A performance estimation apparatus and method for a nonlinear communication system and an electronic device. The nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

9 Claims, 5 Drawing Sheets

(56) References Cited

U.S. PATENT DOCUMENTS

| | | | |
|---|---|---|---|
| 2014/0273889 A1* | 9/2014 | Manku | H04B 1/44 |
| | | | 455/79 |
| 2014/0292406 A1* | 10/2014 | Dechen | H03F 1/3247 |
| | | | 330/149 |
| 2015/0117853 A1 | 4/2015 | Zhang et al. | |
| 2018/0337641 A1* | 11/2018 | Prentice | H04B 10/25754 |
| 2020/0106523 A1 | 4/2020 | Zhang et al. | |

OTHER PUBLICATIONS

Nuno B. Carvalho, et al., "Multisine Signals for Wireless System Test and Design", IEEE Microwave Magazine, Jun. 2008.

* cited by examiner

PERFORMANCE ESTIMATION APPARATUS AND METHOD FOR NONLINEAR COMMUNICATION SYSTEM AND AN ELECTRONIC DEVICE

CROSS-REFERENCE TO RELATED APPLICATIONS

This application is based on and hereby claims priority to Chinese Application No. 202011306919.5, filed Nov. 20, 2020, in the State Intellectual Property Office of China, the disclosure of which is incorporated herein by reference.

TECHNICAL FIELD

This disclosure relates to the field of communication technologies.

BACKGROUND

Optical communication systems occupy an important position in communication transmission networks for their advantages of huge transmission bandwidths, extremely low transmission losses and low costs. In order to further increase communication capacities, a scheme of high baud rate and high-order modulation format is widely used in optical communication systems.

However, in the scheme of high baud rate and high-order modulation format, nonlinear distortion of electronic devices and optoelectronic devices has become an important factor that limits system performances. Even for the same non-linear device, at different baud rates and different modulation formats, nonlinear characteristics are not identical, and nonlinear effects on system performances are also different. Therefore, accurate estimation of performances of an optical communication system where nonlinear distortion exists is a key to improve the performances of the transmission systems.

In an existing method, nonlinear characteristics of the system are generally described by estimating parameters, such as harmonic distortion, total harmonic distortion (THD), and intermodulation distortion.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an aspect of the embodiments of this disclosure, there is provided a performance estimation apparatus for a nonlinear communication system, the apparatus including: an equivalence unit configured to input a first signal transmitted by a transmitter of the nonlinear communication system into an equivalent model used for equating with the nonlinear communication system; and an estimating unit configured to estimate a performance of the nonlinear communication system according to a second signal outputted by the equivalent model and the first signal; wherein the equivalent model includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

According to an aspect of the embodiments of this disclosure, there is provided an electronic device, including the apparatus as described in the embodiments of this disclosure.

According to an aspect of the embodiments of this disclosure, there is provided a performance estimation method for a nonlinear communication system, the method including: inputting a first signal transmitted by a transmitter of the nonlinear communication system into an equivalent model used for equating with the nonlinear communication system; and estimating a performance of the nonlinear communication system according to a second signal outputted by the equivalent model and the first signal; wherein the equivalent model includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Describing nonlinear characteristics of a system by estimating parameters such as harmonic distortion, total harmonic distortion, and intermodulation distortion cannot directly describe the system performances. In addition, estimation results of schemes of different baud rates and different modulation formats in the above existing method are identical, hence, performances of the nonlinear communication system of different modulation formats at different baud rates cannot be accurately estimated.

Embodiments of this disclosure provide a performance estimation apparatus and method for a nonlinear communication system and an electronic device. The nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

An advantage of the embodiments of this disclosure exists in that the nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

Embodiment 1

The embodiment of this disclosure provides performance estimation apparatus for a nonlinear communication system.

Figure 1:
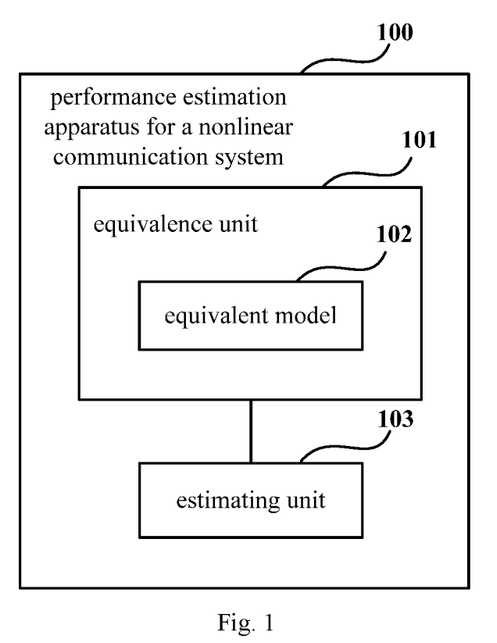
FIG. 1 is schematic diagram of the performance estimation apparatus for a nonlinear communication system of an embodiment of this disclosure.

FIG. 1 is schematic diagram of the performance estimation apparatus for a nonlinear communication system of Embodiment 1 of this disclosure. As shown in FIG. 1, a performance estimation apparatus 100 for a nonlinear communication system includes:

an equivalence unit 101 configured to input a first signal transmitted by a transmitter of the nonlinear communication system into an equivalent model 102 used for equating with the nonlinear communication system; and an estimating unit 103 configured to estimate a performance of the nonlinear communication system according to a second signal outputted by the equivalent model and the first signal;

In the embodiment of this disclosure, the equivalent model 102 includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

It can be seen from the above embodiment that the nonlinear communication system is equated with by the equivalent model including the equivalent linear model and the equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

In the embodiment of this disclosure, the nonlinear communication system refers to various communication systems where nonlinear distortion exists, such as an optical communication system, or a radio frequency communication system.

In the embodiment of this disclosure, the communication system includes a transmitter, a communication link, and a receiver. For example, for an optical communication system, it includes an optical transmitter, an optical fiber link, and an optical receiver.

In the embodiment of this disclosure, the signal transmitted by the transmitter, i.e. an input signal, is X(t), after being transmitted by the nonlinear communication system, an output signal of a receiving side is Y(t), then the output signal may be decomposed into a correlation term $Y_c(t)$ and an orthogonal term $Y_d(t)$ orthogonal to each other, that is, $Y(t)=Y_c(t)+Y_d(t)$.

In the embodiment of this disclosure, the equivalent linear model is for estimation of the correlation term $Y_c(t)$, and the equivalent additive noise model is for estimation of the orthogonal term $Y_d(t)$.

In the embodiment of this disclosure, the apparatus 100 includes the equivalent model 102, the equivalent model 102 being included in the equivalence unit 101.

Figure 2:
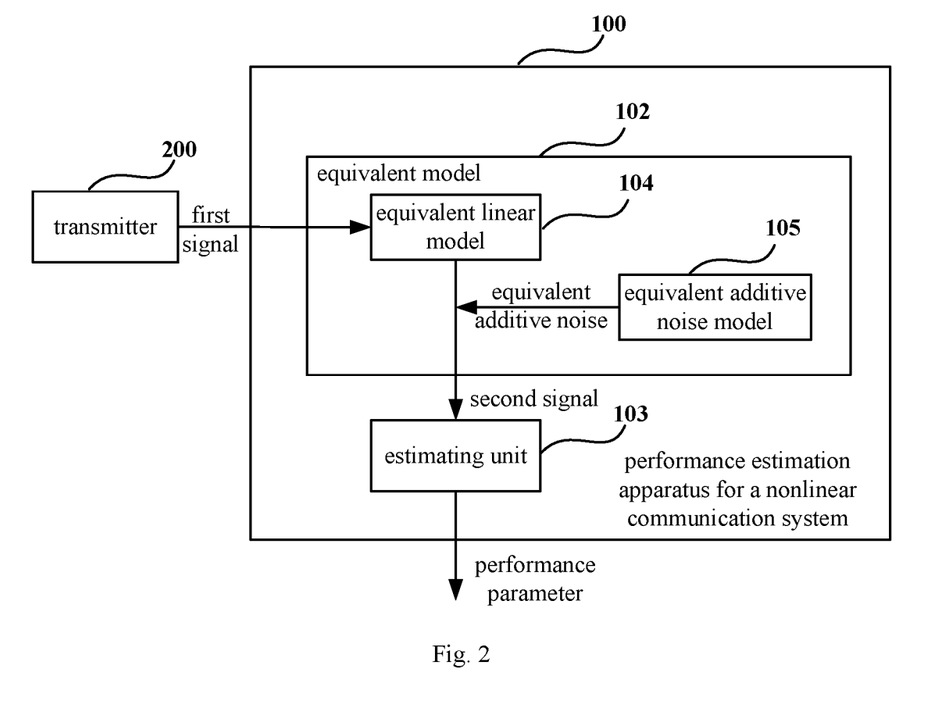
FIG. 2 is a schematic diagram of signal processing of the performance estimation apparatus for a nonlinear communication system of an embodiment of this disclosure.

FIG. 2 is a schematic diagram of signal processing of the performance estimation apparatus for a nonlinear communication system of Embodiment 1 of this disclosure. As shown in FIG. 2, a transmitter 200 of the nonlinear communication system transmits a first signal, the first signal is inputted into the equivalent linear model 104 of the equivalent model 102, and the equivalent additive noise model 105 outputs an equivalent additive noise, the equivalent additive noise is attached to an output signal of the equivalent linear model 104 to obtain a second signal, and the second signal is inputted into the estimating unit 103 to obtain a performance parameter of the nonlinear communication system.

In the embodiment of this disclosure, the performance parameter of the nonlinear communication system may be at least one of parameters used to estimate the performance of the nonlinear communication system, such as at least one of an error vector magnitude (EVM), an error bit error rate (BER), and a Q value.

In the embodiment of this disclosure, the equivalent additive noise is mathematically uncorrelated to the first signal. The "mathematically uncorrelated" refers to uncorrelated in the mathematical sense, rather than absolute unrelated; for example, the integral after the equivalent additive noise is multiplied by the first signal is zero.

In the embodiment of this disclosure, the equivalent model 102 is related to the type of the inputted first signal, such as being related to a modulation format and/or bandwidth of the first signal. That is, first signals of different modulation formats may correspond to different equivalent models.

Hereinafter, the equivalent model 102 of the embodiment of this disclosure shall be particularly described.

In the embodiment of this disclosure, the equivalent model 102 includes an equivalent linear model 104 and an equivalent additive noise model 105, the equivalent linear model 104 being able to be obtained by using a related method.

For example, an equivalent linear filter of the output signal Y(t) with respect to the input signal X(t) is directly estimated, and the equivalent linear filter is the equivalent linear model. For example, for estimation of the equivalent linear filter, for example, a mean square error algorithm based on a minimum mean square error criterion may be used, or a zero-forcing algorithm based on a minimum peak distortion criterion may be used. However, a particular used algorithm is not limited in the embodiment of this disclosure.

For another example, the equivalent linear filter contains two parts, a phase-frequency response and an amplitude-frequency response. The phase-frequency response may use a phase-frequency response measured under input of a small signal $X_{min}(t)$, and the amplitude-frequency response may use an amplitude-frequency response measured under the input of the small signal $X_{min}(t)$ multiplied by a gain value. The gain value is the power ratio of the output signal Y(t) to which the input signal X(t) corresponds to the output signal $Y_{min}(t)$ to which the small signal $X_{min}(t)$ corresponds.

For a further example, the phase-frequency response of the equivalent linear filter adopts a phase-frequency response measured under the input of the small signal $X_{min}(t)$, and the amplitude-frequency response of the equivalent linear filter adopts an amplitude-frequency response measured under the input of the input signal X(t).

In the embodiment of this disclosure, a purpose of the equivalent additive noise model 105 is to output equivalent additive noises. A method for determining equivalent additive noises, that is, how to obtain the equivalent additive noise model 105, shall be described below in detail.

For example, the equivalent additive noise outputted by the equivalent additive noise model is an orthogonal term of a fourth signal outputted after the third signal is inputted into the nonlinear communication system, the third signal and the first signal belonging to the same type of signals.

In the embodiment of this disclosure, the third signal and the first signal belong to the same type of signals. For example, the third signal is identical to the first signal with respect to a modulation format, a bandwidth, a sampling rate, a pulse shaping method and parameters.

In this way, by establishing the equivalent additive noise model based on a signal of a type identical to that of the first signal to be detected, an accurate estimation result may be obtained.

In the embodiment of this disclosure, the orthogonal term of the fourth signal may be obtained according to the fourth signal and a fifth signal outputted after the third signal is inputted into the equivalent linear model. For example, the orthogonal term of the fourth signal is obtained by subtracting the fifth signal from the fourth signal.

For example, the equivalent additive noise outputted by the equivalent additive noise model is a first noise signal having a spectral characteristic and a probability distribution characteristic identical to those of an orthogonal term of a sixth signal, the sixth signal being a signal outputted after the first signal is inputted into the nonlinear communication system.

In this way, as the spectral characteristic and probability distribution characteristic are simultaneously taken into account in establishing the equivalent additive noise model, an accurate estimation result may be obtained.

Figure 3:
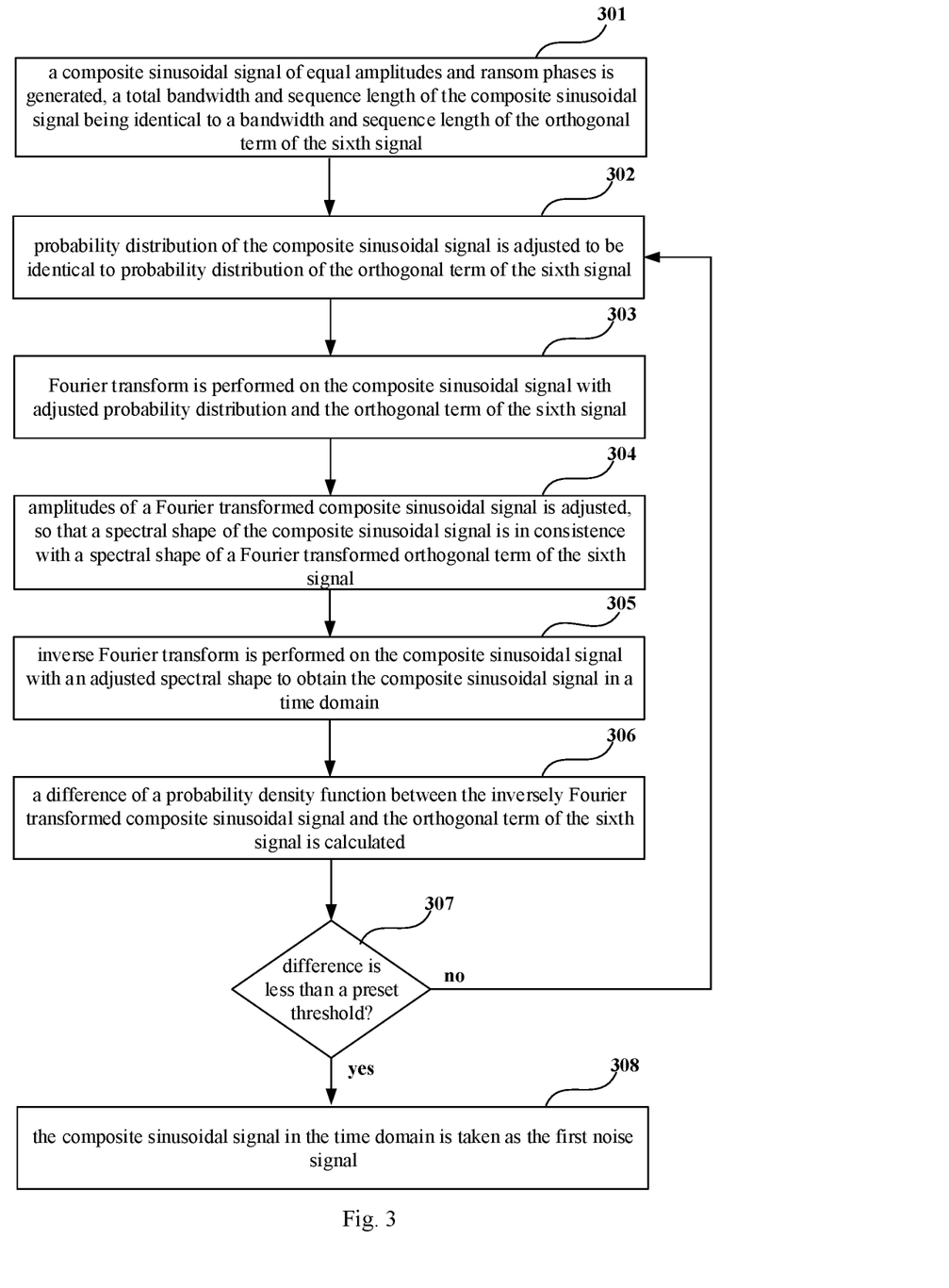
FIG. 3 is a schematic diagram of a method for obtaining a first noise signal of an embodiment of this disclosure.

FIG. 3 is a schematic diagram of a method for obtaining the first noise signal of Embodiment 1 of this disclosure. As shown in FIG. 3, the method includes:

Operation 301: a composite sinusoidal signal of equal amplitudes and ransom phases is generated, a total bandwidth and sequence length of the composite sinusoidal signal being identical to a bandwidth and sequence length of the orthogonal term of the sixth signal;

Operation 302: probability distribution of the composite sinusoidal signal is adjusted to be identical to probability distribution of the orthogonal term of the sixth signal;

Operation 303: Fourier transform is performed on the composite sinusoidal signal with adjusted probability distribution and the orthogonal term of the sixth signal;

Operation 304: amplitudes of a Fourier transformed composite sinusoidal signal is adjusted, so that a spectral shape of the composite sinusoidal signal is in consistence with a spectral shape of a Fourier transformed orthogonal term of the sixth signal;

Operation 305: inverse Fourier transform is performed on the composite sinusoidal signal with an adjusted spectral shape to obtain the composite sinusoidal signal in a time domain;

Operation 306: a difference of a probability density function between the inversely Fourier transformed composite sinusoidal signal and the orthogonal term of the sixth signal is calculated; and Operation 307: it is determined whether the difference is less than a preset threshold, entering into operation 308 when it is determined "yes", and turning back to operation 302 when it is determined "no"; and Operation 308: the composite sinusoidal signal in the time domain is taken as the first noise signal.

Figure 4:
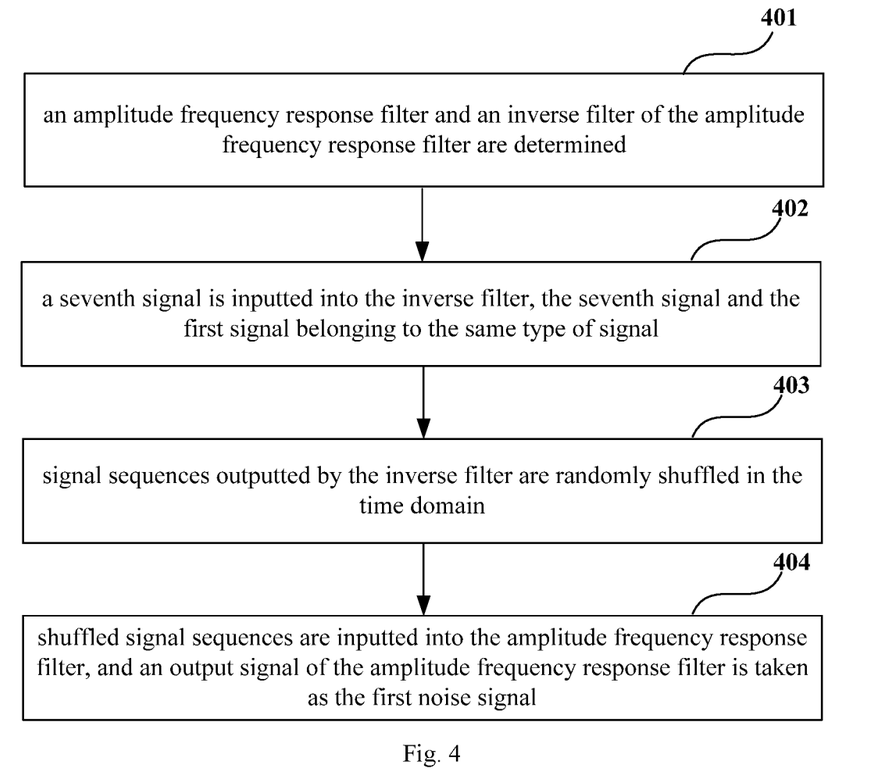
FIG. 4 is a schematic diagram of another method for obtaining a first noise signal of an embodiment of this disclosure.

FIG. 4 is a schematic diagram of another method for obtaining a first noise signal of Embodiment 1 of this disclosure. As shown in FIG. 4, the method includes:

Operation 401: an amplitude frequency response filter and an inverse filter of the amplitude frequency response filter are determined;

Operation 402: a seventh signal is inputted into the inverse filter, the seventh signal and the first signal belonging to the same type of signal;

Operation 403: signal sequences outputted by the inverse filter are randomly shuffled in the time domain; and Operation 404: shuffled signal sequences are inputted into the amplitude frequency response filter, and an output signal of the amplitude frequency response filter is taken as the first noise signal.

For example, the equivalent additive noise outputted by the equivalent additive noise model is a noise with a spectral characteristic identical to that of the orthogonal term of the sixth signal, the sixth signal being a signal outputted after the first signal is inputted into the nonlinear communication system.

In the embodiment of this disclosure, a type of the probability distribution of the noise is not limited. For example, a noise of Gaussian distribution may be used. First, the amplitude-frequency response filter and total power of the orthogonal term of the sixth signal are estimated, then a Gaussian white noise is generated and passes through the amplitude-frequency response filter, and finally total power of the obtained sequence is locked to be power identical to that of the orthogonal term of the sixth signal.

For example, the equivalent additive noise outputted by the equivalent additive noise model is a noise having power identical to that of the orthogonal term of the sixth signal, the sixth signal being a signal outputted after the first signal is inputted into the nonlinear communication system.

In the embodiment of this disclosure, for example, the total power of the orthogonal term of the sixth signal is estimated first, and then the Gaussian white noise is generated and the power is locked to be power identical to that of the orthogonal term of the sixth signal.

For example, the equivalent additive noise outputted by the equivalent additive noise model is a noise having a probability distribution characteristic identical to that of the orthogonal term of the sixth signal, the sixth signal being a signal outputted after the first signal is inputted into the nonlinear communication system.

In the embodiment of this disclosure, related methods, such as inverse transform sampling, rejection-accept sampling, and Gaussian mixture model, etc., may be used to obtain noises with identical probability distribution characteristics.

In the embodiment of this disclosure, the estimating unit 103 estimates a performance of the nonlinear communication system according to the second signal outputted by the equivalent model and the first signal.

The performance of the nonlinear communication system may be estimated by using at least one of various parameters used for estimating the performance of the nonlinear communication system, such as using an error vector magnitude (EVM), a bit error rate (BER), and a Q value.

In the embodiment of this disclosure, for different communication systems, estimation methods may not be completely identical.

For example, for a radio frequency communication system, at a receiver side, after linear equalization and data recovery are sequentially performed on the second signal, the error rate and/or Q value is/are estimated with reference to the first signal.

For example, for a single-polarization optical communication system, at a receiver side, after linear equalization, frequency difference estimation, phase recovery and data recovery are sequentially performed on the second signal, the bit error rate and/or Q value is/are estimated with reference to the first signal.

For example, for a dual-polarization optical communication system, at a receiver side, after FIR linear equalization, frequency difference estimation, phase recovery and data recovery are performed on the second signal, the bit error rate and/or Q value is/are estimated with reference to the first signal.

It can be seen from the above embodiment that the nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

Embodiment 2

The embodiment of this disclosure provides an electronic device, including the performance estimation apparatus for a nonlinear communication system described in Embodiment 1, and reference may be made to what is described in Embodiment 1 for a structure and function of the performance estimation apparatus for a nonlinear communication system, which shall not be described herein any further.

In the embodiment of this disclosure, the electronic device may perform performance estimation on the nonlinear communication system in an off-line manner.

Figure 5:
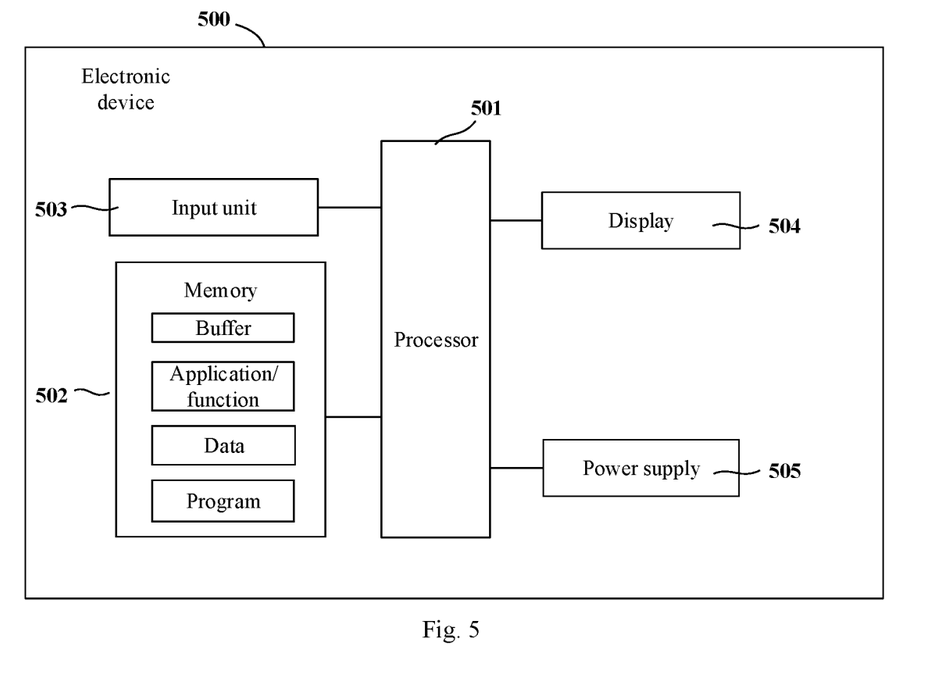
FIG. 5 is a schematic diagram of a systematic structure of the electronic device of an embodiment of this disclosure.

FIG. 5 is a schematic diagram of a systematic diagram of the electronic device of Embodiment 2 of this disclosure. As shown in FIG. 5, an electronic device 500 may include a processor 501 and a memory 502, the memory 502 being coupled to the processor 501. This figure is illustrative only, and other types of structures may also be used, so as to supplement or replace this structure and achieve a telecommunications function or other functions.

As shown in FIG. 5, the electronic device 500 may further include an input unit 503, a display 504, and a power supply 505.

In one implementation, the functions of the performance estimation apparatus for a nonlinear communication system described in Embodiment 1 may be integrated into the processor 501. In the embodiment of this disclosure, the processor 501 may be configured to: input a first signal transmitted by a transmitter of the nonlinear communication system into an equivalent model used for equating with the nonlinear communication system, and estimate a performance of the nonlinear communication system according to a second signal outputted by the equivalent model and the first signal; wherein the equivalent model includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

In another implementation, the performance estimation apparatus for a nonlinear communication system described in Embodiment 1 and the processor 501 may be configured separately. For example, the performance estimation apparatus for a nonlinear communication system may be configured as a chip connected to the processor 501, and the functions of the performance estimation apparatus for a nonlinear communication system are executed under control of the processor 501.

In this embodiment, the electronic device 500 does not necessarily include all the parts shown in FIG. 5.

As shown in FIG. 5, the processor 501 is sometimes referred to as a controller or an operational control, which may include a microprocessor or other processor devices and/or logic devices. The processor 501 receives input and controls operations of components of the electronic device 500.

The memory 502 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 501 may execute programs stored in the memory 502, so as to realize information storage or processing, etc. Functions of other parts are similar to those of the related art, which shall not be described herein any further. The parts of the electronic device 500 may be realized by specific hardware, firmware, software, or any combination thereof, without departing from the scope of this disclosure.

It can be seen from the above embodiment that the nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

Embodiment 3

The embodiment of this disclosure provides a performance estimation method for a nonlinear communication system, corresponding to the performance estimation apparatus for a nonlinear communication system in Embodiment 1.

Figure 6:
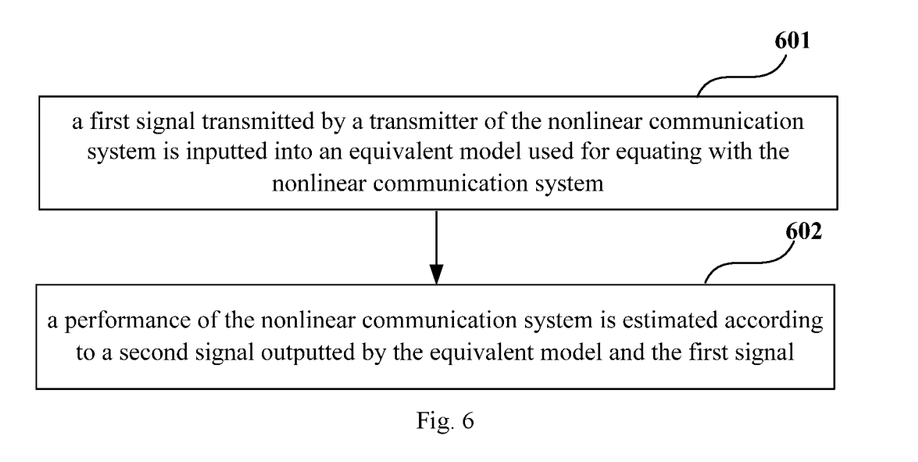
FIG. 6 is a schematic diagram of the performance estimation method for a nonlinear communication system of an embodiment of this disclosure.

FIG. 6 is a schematic diagram of the performance estimation method for a nonlinear communication system of Embodiment 3 of this disclosure. As shown in FIG. 6, the method includes:

Operation 601: a first signal transmitted by a transmitter of the nonlinear communication system is inputted into an equivalent model used for equating with the nonlinear communication system; and Operation 602: a performance of the nonlinear communication system is estimated according to a second signal outputted by the equivalent model and the first signal;

In the embodiment of this disclosure, the equivalent model includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

In this embodiment, reference may be made to implementations of the functions of the units in Embodiment 1 for execution of the above operations, which shall not be described herein any further.

It can be seen from the above embodiment that the nonlinear communication system is equated with by an equivalent model including an equivalent linear model and an equivalent additive noise model, and the equivalent additive noise outputted by the equivalent additive noise model is mathematically uncorrelated to the signal inputted into the equivalent model. Performances of the nonlinear communication system of different modulation formats at different baud rates may be accurately estimated.

An embodiment of this disclosure provides a computer readable program, which, when executed in a performance estimation apparatus for a nonlinear communication system or electronic device, will cause a computer to carry out the performance estimation method for a nonlinear communication system as described in Embodiment 3 in the performance estimation apparatus for a nonlinear communication system or electronic device.

An embodiment of this disclosure provides a computer storage medium, including a computer readable program, which will cause a computer to carry out the performance estimation method for a nonlinear communication system as described in Embodiment 3 in a performance estimation apparatus for a nonlinear communication system or electronic device.

Carrying out the performance estimation method in the performance estimation apparatus for a nonlinear communication system or electronic device described in conjunction with the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the operations shown in FIG. 6. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

Following supplements are further disclosed in the embodiments of this disclosure.

1. A performance estimation method for a nonlinear communication system, the method including:
inputting a first signal transmitted by a transmitter of the nonlinear communication system into an equivalent model used for equating with the nonlinear communication system; and estimating a performance of the nonlinear communication system according to a second signal outputted by the equivalent model and the first signal;

wherein the equivalent model includes an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

2. The method according to supplement 1, wherein, the equivalent additive noise outputted by the equivalent additive noise model is an orthogonal term of a fourth signal outputted after a third signal is inputted into the nonlinear communication system, the third signal and the first signal belonging to the same type of signal.

3. The method according to supplement 2, wherein, the orthogonal term of the fourth signal is obtained according to the fourth signal and a fifth signal outputted after the third signal is inputted into the equivalent linear model.

4. The method according to supplement 1, wherein, the equivalent additive noise outputted by the equivalent additive noise model is a first noise signal having a spectral characteristic and probability distribution function characteristic identical to those of an orthogonal term of a sixth signal, the sixth signal being a signal outputted after the first signal is inputted into the nonlinear communication system.

5. The method according to supplement 4, wherein the first noise signal is obtained in the following steps:

generating a composite sinusoidal signal of equal amplitudes and ransom phases, a total bandwidth and sequence length of the composite sinusoidal signal being identical to a bandwidth and sequence length of the orthogonal term of the sixth signal;

adjusting probability distribution function of the composite sinusoidal signal to be identical to probability distribution function of the orthogonal term of the sixth signal;

performing Fourier transform on the composite sinusoidal signal with adjusted probability distribution function and the orthogonal term of the sixth signal;

adjusting amplitudes of a Fourier transformed composite sinusoidal signal, so that a spectral shape of the composite sinusoidal signal is in consistence with a spectral shape of a Fourier transformed orthogonal term of the sixth signal;

performing inverse Fourier transform on the composite sinusoidal signal with an adjusted spectral shape to obtain the composite sinusoidal signal in a time domain;

calculating a difference of a probability density function between the inversely Fourier transformed composite sinusoidal signal and the orthogonal term of the sixth signal; and taking the composite sinusoidal signal in the time domain as the first noise signal when the difference is less than a preset threshold, and repeating above steps when the difference is greater than or equal to the preset threshold, until the difference is less than the preset threshold.

6. The method according to supplement 4, wherein the first noise signal is obtained in the following steps:

determining an amplitude frequency response filter and an inverse filter of the amplitude frequency response filter;

inputting a seventh signal into the inverse filter, the seventh signal and the first signal belonging to the same type of signal;

randomly shuffling signal sequences outputted by the inverse filter in the time domain; and inputting shuffled signal sequences into the amplitude frequency response filter, and taking an output signal of the amplitude frequency response filter as the first noise signal.

7. The method according to supplement 1, wherein, the equivalent additive noise outputted by the equivalent additive noise model is a noise having the same spectral characteristic as the orthogonal term of the sixth signal, the sixth signal being a signal outputted after the first signal is inputted into the nonlinear communication system.

8. The method according to supplement 1, wherein, the equivalent additive noise outputted by the equivalent additive noise model is a noise having the same power as the orthogonal term of the sixth signal, the sixth signal being a signal outputted after the first signal is inputted into the nonlinear communication system.

9. The method according to supplement 1, wherein, the equivalent additive noise outputted by the equivalent additive noise model is a noise having the same probability distribution function characteristic as the orthogonal term of the sixth signal, the sixth signal being a signal outputted after the first signal is inputted into the nonlinear communication system.

What is claimed is:

1. An apparatus for performance estimation for a nonlinear communication system, the apparatus comprising:

a memory that stores a plurality of instructions; and a processor coupled to the memory and configured to:

input a first signal transmitted by a transmitter of the nonlinear communication system into an equivalent model used for equating with the nonlinear communication system; and estimate a performance of the nonlinear communication system according to a second signal outputted by the equivalent model and the first signal;

wherein the equivalent model comprises an equivalent linear model and an equivalent additive noise model, the equivalent additive noise model attaching an equivalent additive noise to an output signal of the equivalent linear model to obtain the second signal, the equivalent additive noise being mathematically uncorrelated to the first signal.

2. The apparatus according to claim 1, wherein the equivalent additive noise outputted by the equivalent additive noise model is an orthogonal term of a fourth signal outputted after a third signal is inputted into the nonlinear communication system, the third signal and the first signal belonging to the same type of signal.

3. The apparatus according to claim 2, wherein the orthogonal term of the fourth signal is obtained according to the fourth signal and a fifth signal outputted after the third signal is inputted into the equivalent linear model.

4. The apparatus according to claim 1, wherein the equivalent additive noise outputted by the equivalent additive noise model is a first noise signal having a spectral characteristic and probability distribution function characteristic identical to those of an orthogonal term of a sixth signal, the sixth signal being a signal outputted after the first signal is inputted into the nonlinear communication system.

5. The apparatus according to claim 4, wherein the first noise signal is obtained by:

generating a composite sinusoidal signal of equal amplitudes and ransom phases, a total bandwidth and sequence length of the composite sinusoidal signal being identical to a bandwidth and sequence length of the orthogonal term of the sixth signal;

adjusting probability distribution function of the composite sinusoidal signal to be identical to probability distribution function of the orthogonal term of the sixth signal;

performing Fourier transform on the composite sinusoidal signal with adjusted probability distribution function and the orthogonal term of the sixth signal;

adjusting amplitudes of a Fourier transformed composite sinusoidal signal, so that a spectral shape of the composite sinusoidal signal is in consistence with a spectral shape of a Fourier transformed orthogonal term of the sixth signal;

performing inverse Fourier transform on the composite sinusoidal signal with an adjusted spectral shape to obtain the composite sinusoidal signal in a time domain;

calculating a difference of a probability density function between the inversely Fourier transformed composite sinusoidal signal and the orthogonal term of the sixth signal; and taking the composite sinusoidal signal in the time domain as the first noise signal when the difference is less than a preset threshold, and repeating the generating, the adjusting of probability distribution function of the composite sinusoidal signal, the performing of the adjusting of the amplitudes of the Fourier transformed composite sinusoidal signal, the performing of the inverse Fourier transform on the composite sinusoidal and the calculating of the difference, when the difference is greater than or equal to the preset threshold, until the difference is less than the preset threshold.

6. The apparatus according to claim 4, wherein the first noise signal is obtained by:

determining an amplitude frequency response filter and an inverse filter of the amplitude frequency response filter;

inputting a seventh signal into the inverse filter, the seventh signal and the first signal belonging to the same type of signal;

randomly shuffling signal sequences outputted by the inverse filter in the time domain a time domain; and inputting shuffled signal sequences into the amplitude frequency response filter, and taking an output signal of the amplitude frequency response filter as the first noise signal.

7. The apparatus according to claim 1, wherein
the equivalent additive noise outputted by the equivalent additive noise model is a noise having the same spectral characteristic as an orthogonal term of a sixth signal, the sixth signal being a signal outputted after the first signal is inputted into the nonlinear communication system.

8. The apparatus according to claim 1, wherein
the equivalent additive noise outputted by the equivalent additive noise model is a noise having the same power as an orthogonal term of a sixth signal, the sixth signal being a signal outputted after the first signal is inputted into the nonlinear communication system.

9. The apparatus according to claim 1, wherein
the equivalent additive noise outputted by the equivalent additive noise model is a noise having the same probability distribution function characteristic as an orthogonal term of a sixth signal, the sixth signal being a signal outputted after the first signal is inputted into the nonlinear communication system.

* * * * *